United States Patent [19]

Hopper et al.

[11] Patent Number: 4,577,273
[45] Date of Patent: Mar. 18, 1986

[54] MULTIPLE MICROCOMPUTER SYSTEM FOR DIGITAL COMPUTERS

[75] Inventors: Michael G. Hopper, Burke, Va.; Harri G. Prival, Potomac, Md.

[73] Assignee: Sperry Corporation, New York, N.Y.

[21] Appl. No.: 501,304

[22] Filed: Jun. 6, 1983

[51] Int. Cl.[4] .............................................. G06F 15/16
[52] U.S. Cl. ................................................... 364/200
[58] Field of Search ............................... 364/200, 900

[56] References Cited

U.S. PATENT DOCUMENTS

| 4,223,380 | 9/1980 | Antonaccio et al. | 364/200 |
| 4,503,496 | 3/1985 | Holzner et al. | 364/200 |
| 4,504,902 | 3/1985 | Gallaher et al. | 364/200 |
| 4,504,906 | 3/1985 | Itaya et al. | 364/200 |

Primary Examiner—Gareth D. Shaw
Assistant Examiner—Martin Yuen
Attorney, Agent, or Firm—Howard P. Terry; Martin G. Anderson

[57] ABSTRACT

A multiple microcomputer system in which each microcomputer can execute independent programs, transfer data at high speed to or from the memory of any microcomputer in the system, and signal between microcomputers that data has been transferred and the action to be taken on the transferred data.

1 Claim, 4 Drawing Figures

MULTIPLE MICROCOMPUTER SYSTEM FOR DIGITAL COMPUTERS

BACKGROUND OF THE INVENTION

1. Field of the Invention

This invention pertains to multiple microcomputer systems particularly with respect to inter-computer communication.

2. Description of the Prior Art

Multiple microcomputer systems are well known. A general discussion of design considerations is contained in Bowen, The Logical Design of Multiple Microprocessor Systems, Prencice Hall, 1980, particularly chapter 4 PP 71–108 and chapter 9 pp 247–257, and the end of chapter references. Previously in multiple computer configurations, several processors shared a common memory, in part, because memories were often faster than the processors they served. With increases in processor speed it has become common to associate each professor with its own memory. If each processor only accesses its own memory, the benefits of a multiple processor system are reduced. If all processors share a common memory, communication bus congestion becomes a problem particularly when the common memory is used to store frequently executed programs. The present invention uses a combination of memory dedicated to each processor (i.e. local memory) and dedicated blocks in memories associated with each of the other microcomputers in the system. In addition, the present invention provides a novel method of inter-computer signalling.

SUMMARY OF THE INVENTION

The present invention is a multiple microcomputer system for processing digital data. The multiple microcomputers in the system are capable of simultaneously executing individual programs, can interchange data at high speed, and can signal each other regarding the transmission and receipt of exchanged data.

Data is exchanged between memories associated with each microcomputer by a direct memory access technique. Each microcomputer in the system is assigned and wired to recognize a unique identification number which is a portion of the address field. Another portion of the address field contains the memory location in the identified microcomputer to which data is to be transferred. This addressing scheme effectively partitions the memory of each microcomputer in the system so that a block of the memory of each microcomputer is dedicated to each of the other microcomputers in the system.

When one microcomputer in the system writes to a memory address in another microcomputer, it causes a bus request signal to be sent to a priority resolution circuit. Access to the bus is granted by the receipt of a bus grant signal from the priority resolution circuit at which time communication between the two microcomputers proceeds over the bus. The last word in the data transfer acts as a signal to the receiving microcomputer that a data transfer has taken place, provides the identity of the sending microcomputer, and causes an interrupt that specifies to the receiving microcomputer what processing is to be done on the transferred data.

DESCRIPTION OF THE PREFERRED EMBODIMENT

Figure 1:
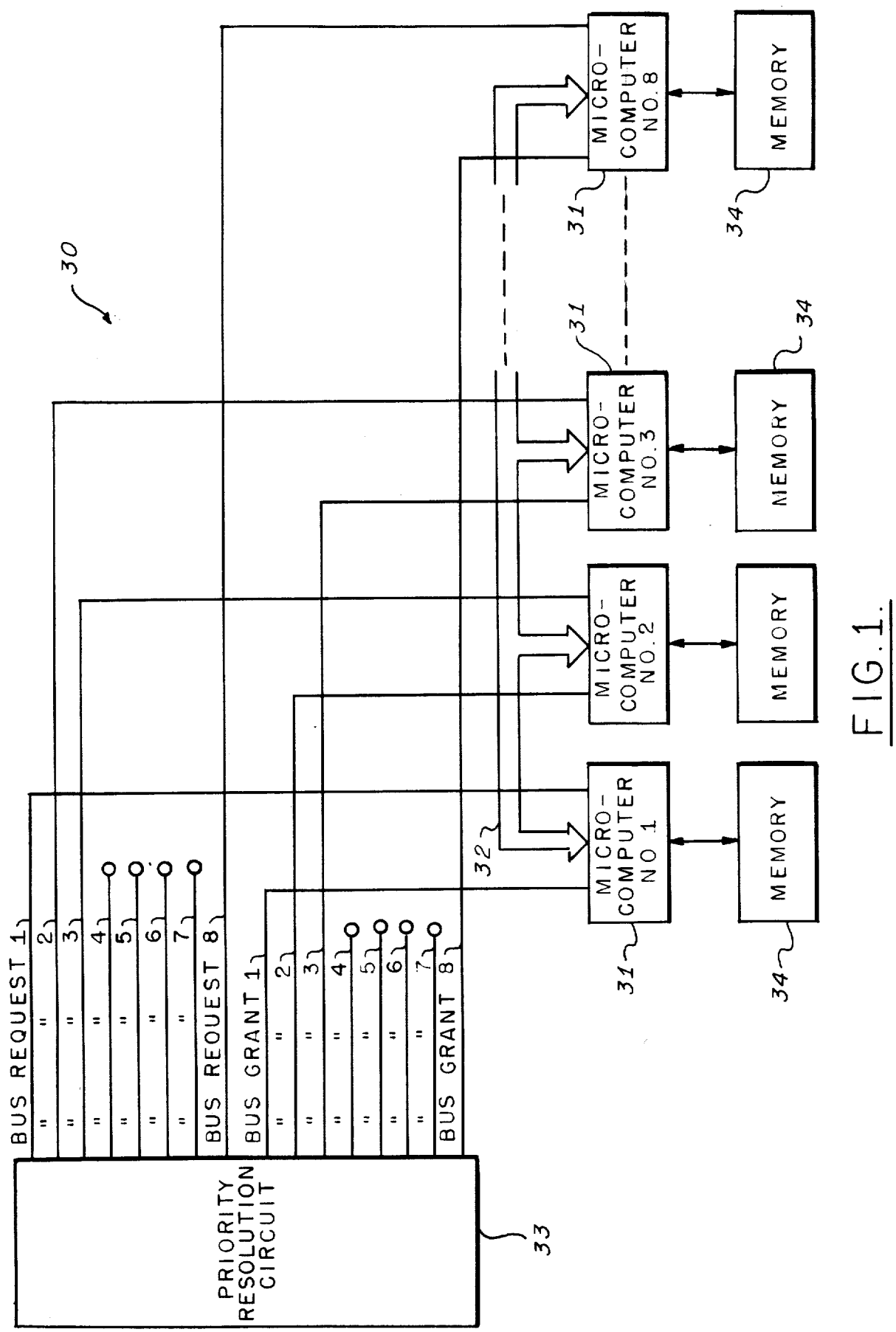
FIG. 1 is a block diagram of the multiple microcomputer system.
Figure 2:
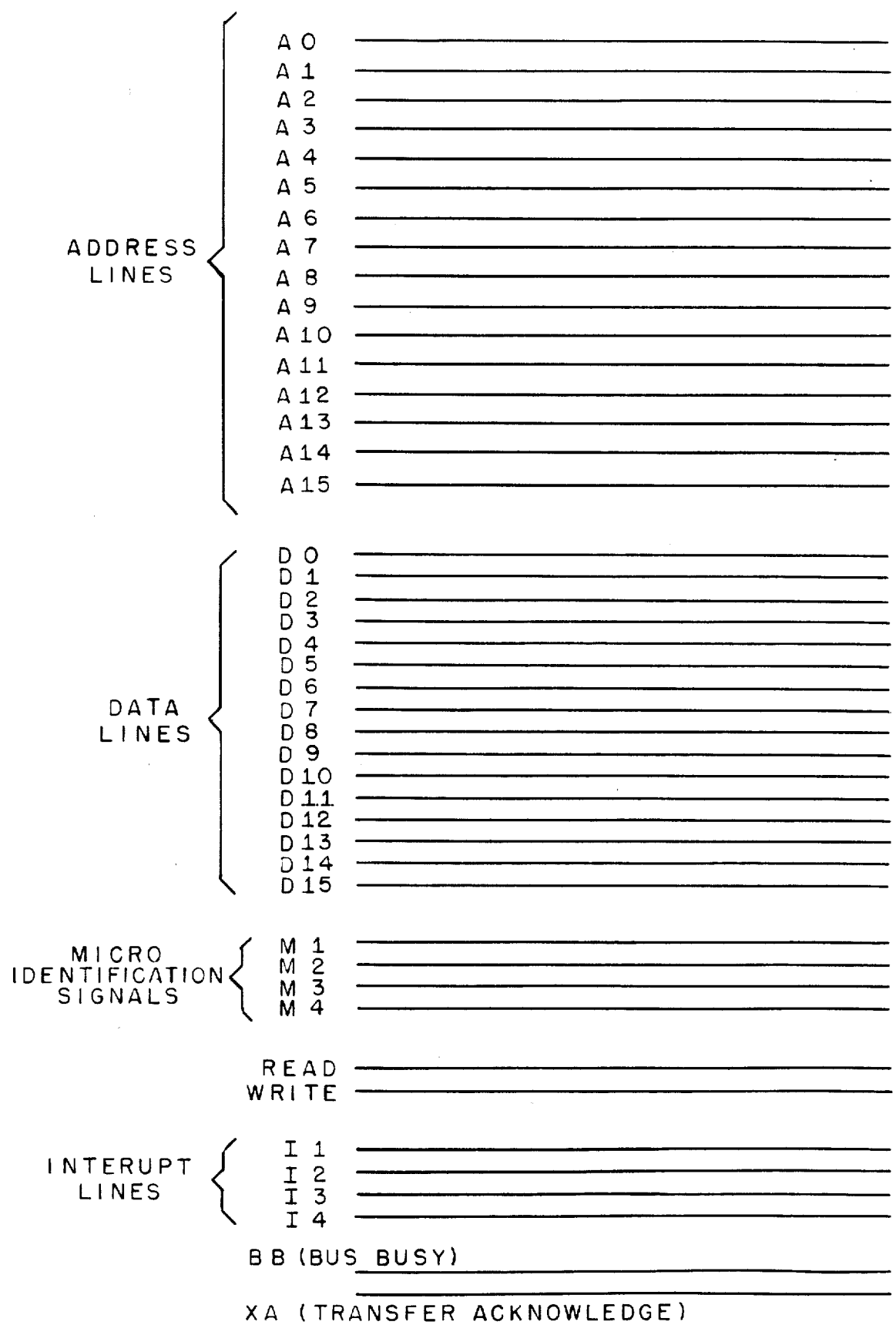
FIG. 2 is a diagram of the structure of the communication bus.

In FIG. 1, a multiple microcomputer system 30 contains a plurality of microcomputers 31 coupled to receive and to provide data, address, and control signals to a common communication bus 32. Each microcomputer 31 in the system is also individually coupled to provide a bus request signal and receive a bus grant signal from the priority resolution circuit 33. Each microcomputer 31 and its associated memory 34 is of a general design well known in the art and may include an Intel 8086 microprocessor and a combination of read only memory and random access memory. A terminal device (not shown) may be connected to the system in a conventional manner for testing and entering programs. The communications bus 32 in FIG. 2 is connected to corresponding points in each microcomputer to provide a path for inter-microcomputer communications and signalling. Each such point may be a source or sink of data.

Each microcomputer 31 in the system is assigned a unique four bit identification number. To access the memory in another microcomputer, a given microcomputer 31 reads or writes to a 20 bit address field. The four most significant bits of the address which appear on the identification lines of the communication bus specify the identity of a particular microcomputer in the system. The four most significant bits of the address field are decoded to partition the memory into blocks of which there may be 16 blocks of 65 k bytes each. The 16 least significant bits in the address field specify the memory location in either local or remote memory. Each microcomputer in the system contains a comparator shown in FIG. 4. The comparator circuit continuously compares the identification code on the bus 32 with the assigned identification number and signals the microcomputer 31 when its identification number is on the bus 32.

Communication between microcomputers 31 in the system proceeds as follows: Upon issuing a write instruction the sending microcomputer 31 enters a "wait" state and asserts a bus request signal. If the bus busy signal is inactive and the sending microcomputer 31 is the highest priority requestor, the priority resolution circuit 33 issues a bus grant signal to the sending microcomputer 31. The sending microcomputer 31 puts a "bus busy" signal on the bus inhibiting other microcomputers 31 from gaining access to the bus and puts the receiving microcomputer's 31 identification number on the bus. The comparator circuit in the receiving microcomputer 31 recognizes the identification number and initiates a "hold request" to the receiving microcomputer 31. The receiving microcomputer 31, entering a passive state at the end of each instruction, recognizes the "hold request" signal, issues a "hold acknowledge" signal, enters a "wait" state, disconnects its memory 34 and connects the bus 32 address, data, and control lines to the memory. The pending operation (write or read) takes place between the sending microcomputer 31 and the memory of the receiving microcomputer 31 by the direct memory access technique. The sequence of transfer events may take place for each word transferred or it may take place after a series of transfers.

In addition to inter-microcomputer communication, the microcomputer system 30 has the ability to signal the transfer of data betwen microcomputers 31. By decoding the address lines of a specific block of memory, which may typically be 16 words, the microcomputer 31 executes a specific interrupt service routine that determines what action is to be taken with the transferred data. Thus, each microcomputer 31 in the system can simultaneously execute independent programs, signal any other microcomputer 31 in the system on an asynchronous basis, and transfer data at high speed to the memory 14 of any other microcomputer 31 in the system over the communication bus 32.

Figure 3:
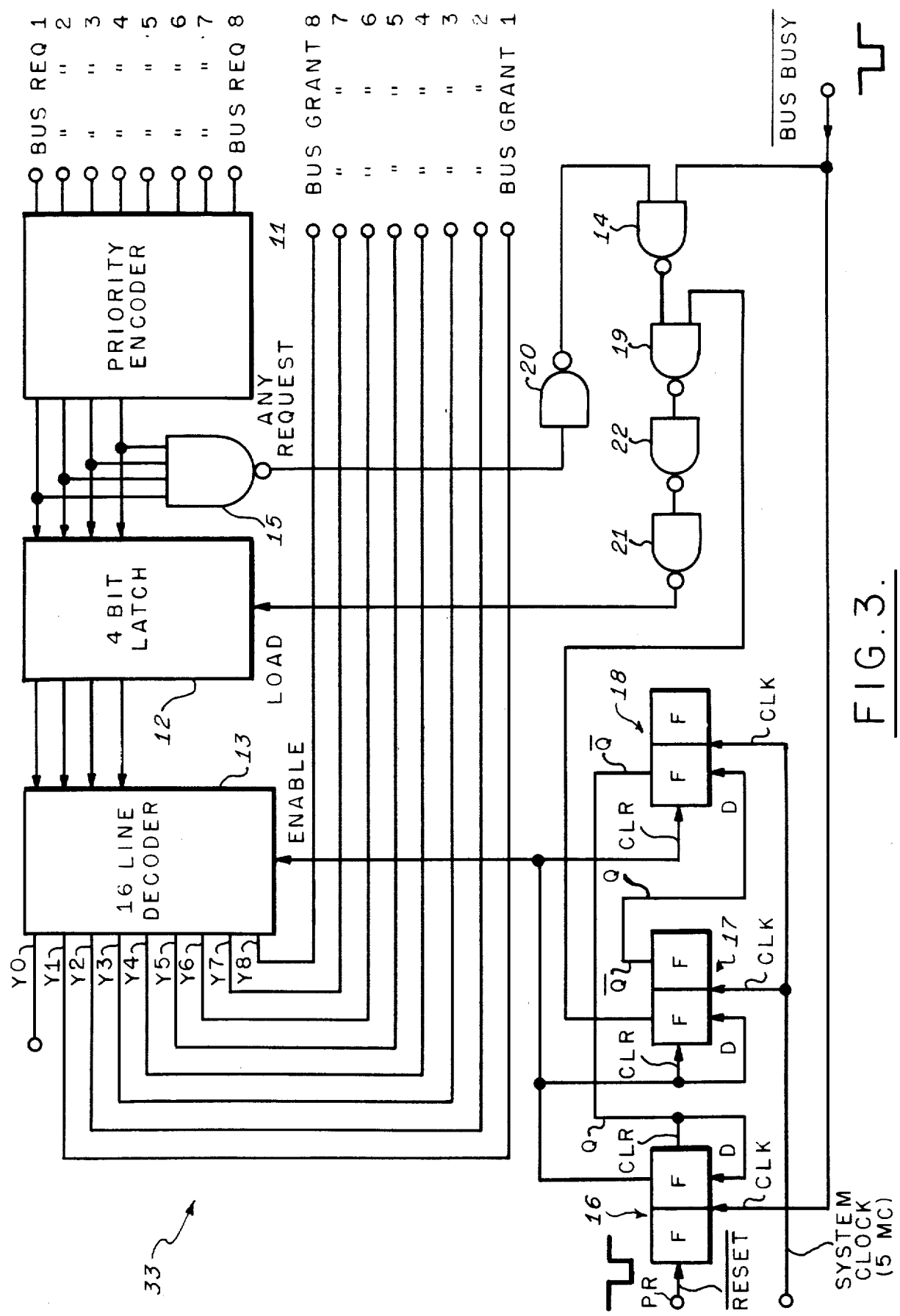
FIG. 3 is a diagram of the priority resolution circuit.

Referring now to FIG. 3, the priority resolution circuit 33 operates in the following manner:

The bus request signals are applied to a priority encoder 11, which gives a binary coded representation of the highest priority input. This coded signal is loaded into the four bit gated latch 12, from which it is transmitted to the decoder 13 where it is decoded to produce a bus grant signal corresponding to the highest priority bus request signal.

If the bus in inactive, the bus busy line will be high and all outputs from the priority encoder 11 will be high. These two conditions cause the output of NAND gate 14 to go low which will force the load line on the four bit latch 12 to be high enabling the latch. A bus request from any processor will cause the output of NAND gate 15 to go high. After five gate delays, provided by gates 14, 19, 20, 21 and 22, the load input to the four bit latch 12 will go low thereby retaining the coded number of the highest priority request and exerting the appropriate bus grant line. Gate 20 is used as an inverter. Gates 21 and 22 are added to provide the required amount of delay.

The bus busy line is exerted by the processor receiving the bus for the duration of the bus transaction(s).

After the bus becomes not busy, the proceeding bus grant signal would persist for a short period of time giving a false bus grant signal were it not for the timing circuit consisting of three flip-flops. Flip-flop 16 will go set as the bus goes not busy. This inhibits all bus grant outputs from sixteen line encoder 13 and removes the clear input to flip-flop 17 and flip-flop 18. The next positive transition of the system clock will cause flip-flop 16 to go set enabling flip-flop 18 and, through NAND gate 19 force the load line of the four bit latch 12 to go high, latching the number of any pending request. The next positive transition of ther system clock will set flip-flop 18 clearing flip-flop 17. This will cause flip-flop 17 and flip-flop 18 to be cleared and will enable bus grants from the sixteen line decoder 13.

Figure 4:
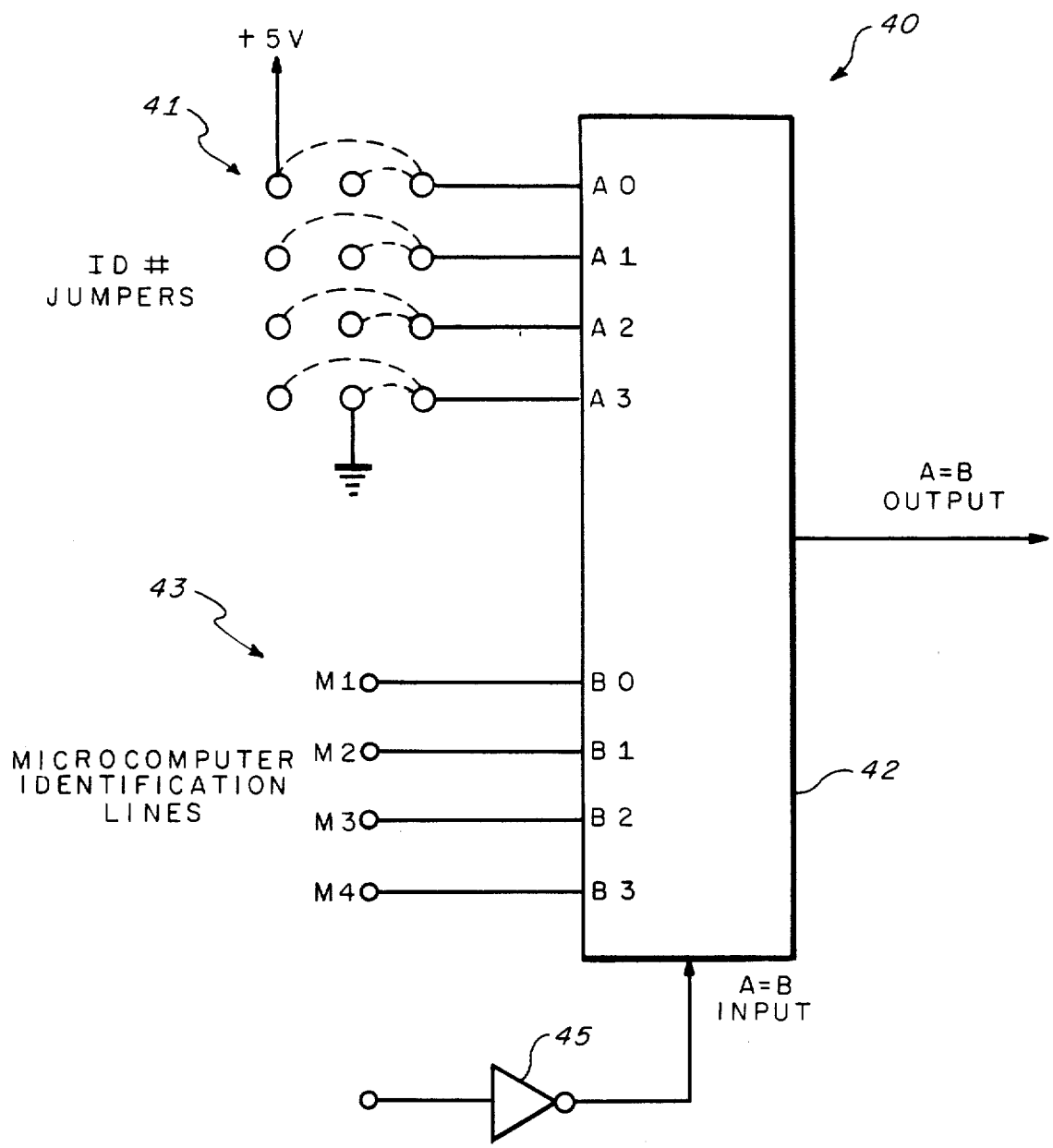
FIG. 4 is a diagram of the comparable circuit in each microcomputer.

Referring now to FIG. 4, the comparator circuit 40 in each microcomputer that continuously monitors the identification signals on the bus operates in the following manner:

Each microcomputer is assigned a unique identification number by four jumpers 41. This number is applied to the A inputs of the four bit comparator 42. The four microcomputer identification lines 43 selecting one of the microcomputers to transfer with are applied to the B inputs of the comparator. When the bus busy line 44 is low and the microcomputer identification signals equal the jumpered ID number, the A-B output from comparator 42 will go high indicating that the microcomputer is the target of a bus request. Gate 45 is used to invert the bus busy signal before input to comparator 42.

While the invention has been described in its preferred embodiments, it is to be understood that the words which have been used are words of description rather than of limitation and that changes may be made within the purview of the appended claims without departing from the true scope and spirit of the invention in its broader aspects.

We claim:

1. A multiple microcomputer system comprising:
 a plurality of microcomputer means coupled to provide data, address, control and identification signals to an intercommunication bus, and coupled to provide a bus request signal to a priority resolution means for executing programs and for signalling and acknowledging high speed interchange of data among said plurality of microcomputer means;
 priority resolution means coupled to provide bus grant signal to said plurality of microcomputer means for determining which microcomputer means among said plurality of microcomputer means shall have access to said intercommunication bus; said priority resolution circuit includes:
 a priority encoder coupled to receive a plurality of bus request signals and coupled to provide an encoded signal to a four bit latch and a first NAND gate;
 a sixteen line decoder coupled to receive an output from said four bit latch and coupled to provide a plurality of said bus grant signals;
 a first inverter coupled to receive an output from said first NAND gate;
 a second NAND gate coupled to receive an output from said first inverter and also coupled to receive a bus busy signal;
 a third NAND gate coupled to receive an output from said second NAND gate and also coupled to receive an input from a second flip-flop;
 a second inverter coupled to receive an input from said third NAND gate;
 a third inverter coupled to receive an input from said second inverter and coupled to provide an output to said four bit latch;
 a first flip-flop coupled to receive a system clock input, a reset input, and a D input from a third flip-flop and coupled to provide an output to said sixteen line decoder;
 said second flip-flop coupled to receive a system clock input and a D input from said first flip-flop;
 said third flip-flop coupled to receive a D input from said second flip-flop, and coupled to receive a system clock input and coupled to receive an output from said first flip-flop;
 plurality of memory means in said plurality of microcomputer means for storage of programs, data, address, and control signals; each of said plurality of memory means having signalling block of memory wherein an address to said signalling block initiates an interrupt signal for specifying a service routine to be followed in regard to processing transferred data;

said plurality of memory means each partitioned into blocks wherein each said block is dedicated to a specified microcomputer means;

coded signals comprising a first predetermined plurality of bits for identifying a selected microcomputer to receive inter-microcomputer communications and a second predetermined plurality of bits for identifying a selected memory location in said selected microcomputer memory means, and coded signal identification circuit contained in each said microcomputer means responsive to said coded signals for recognizing which inter-microcomputer communications are destined for selected microcomputer means.

* * * * *